United States Patent
Urata et al.

(10) Patent No.: US 6,567,442 B2
(45) Date of Patent: May 20, 2003

(54) LASER DEVICE

(75) Inventors: Yoshiharu Urata, Kawagoe (JP); Satoshi Wada, Wako (JP); Hideo Tashiro, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/779,852

(22) Filed: Feb. 9, 2001

(65) Prior Publication Data

US 2001/0022794 A1 Sep. 20, 2001

(30) Foreign Application Priority Data

Feb. 10, 2000 (JP) .......................... 2000-034109

(51) Int. Cl.$^7$ .............................. H01S 3/16; H01S 3/091
(52) U.S. Cl. ............................ 372/41; 372/75
(58) Field of Search ........................ 372/39, 40, 41, 372/75, 71

(56) References Cited

U.S. PATENT DOCUMENTS

| | | | | |
|---|---|---|---|---|
| 5,287,381 A | * | 2/1994 | Hyuga et al. | 372/75 |
| 5,418,808 A | * | 5/1995 | Katoh et al. | 372/41 |
| 5,446,750 A | * | 8/1995 | Ohtsuka et al. | 372/34 |
| 5,506,860 A | * | 4/1996 | Hyuga et al. | 372/98 |
| 5,856,994 A | * | 1/1999 | Hayakawa | 372/75 |
| 5,889,808 A | * | 3/1999 | Kojima et al. | 372/75 |
| 6,014,393 A | * | 1/2000 | Fulbert et al. | 372/41 |
| 6,157,663 A | * | 12/2000 | Wu et al. | 372/75 |
| 6,185,236 B1 | * | 2/2001 | Eichenholz et al. | 372/41 |

FOREIGN PATENT DOCUMENTS

| | | |
|---|---|---|
| JP | 1-249690 A | 10/1989 |
| JP | 5-335678 A | 12/1993 |
| JP | 7-58380 A | 3/1995 |
| JP | 7-106684 A | 4/1995 |
| JP | 10-65258 A | 3/1998 |

OTHER PUBLICATIONS

Kintz et al. "Single–Frequency Operation in Solid–State Laser Materials with Short Absorption Depths." IEEE Journal of Quantu Electronics, vol. 26, No. 9, Sep. 1990, pp. 1457–1459.*

Zhou, Yongzong, "Growth of High Quality Large Nd:YAG Crystals by Temperature Gradient Technique (TGT)," Journal of Crystal Growth 78 (1986), North–Holland, Amsterdam, pp. 31–35.

Deng, Peizhen et al., "Perfection and Laser Performances of Nd:YAG Crystals Grown by Temperature Gradient Technique (TGT)," Journal of Crystal Growth 92 (1988), North–Holland, Amsterdam, pp. 276–286.

Gavrilovic, P. et al., "High–power, single–frequency at 1.3 $\mu$m," Appl. Phys. Lett 65 (13), Sep. 26, 1998, pp. 1620–1622.

* cited by examiner

*Primary Examiner*—Quyen Leung
*Assistant Examiner*—James Menefee
(74) *Attorney, Agent, or Firm*—Birch, Stewart, Kolasch & Birch, LLP (57) ABSTRACT

A laser device which has an excellent characteristic originally exerted by an yttrium-aluminum-garnet crystal doped with neodymium and is entirely reduced in size by using an entirely downsized laser medium is provided. The laser device is constituted such that a laser medium is disposed in a resonator, excited light is incident upon the laser medium so as to cause laser oscillation in the resonator, and laser light is emitted from the resonator. An yttrium-aluminum-garnet single crystal is used as the laser medium, in which neodymium is added at a concentration exceeding an atomicity ratio of 1.3%.

8 Claims, 8 Drawing Sheets

|  | PEAK WAVELENGTH (nm) | OPTICAL DENSITY | ABSORPTION COEFFICIENT (cm$^{-1}$) | BANDWIDTH (nm) |
|---|---|---|---|---|
| 2 at% | 808.85 | 0.94 | 21.6 | 1.05 |
| 3 at% | 808.88 | 1.39 | 32.1 | 1.09 |

LASER DEVICE

BACKGROUND OF THE INVENTION

1. Field of the Invention

The present invention relates to a laser device. More specifically, the present invention relates to a laser device the size of which can be reduced entirely.

2. Description of the Related Art

Conventionally, an yttrium-aluminum-garnet (YAG) crystal doped with neodymium (hereinafter, optionally referred to as "Nd:YAG") has been known as one of representative materials of a solid laser medium. In the yttrium-aluminum-garnet (YAG) crystal with neodymium, neodymium (Nd) is added (hereinafter, optionally referred to as "doped") as a laser active ion.

This is because the Nd:YAG crystal presents a variety of advantages when being used as a laser medium.

Namely, the Nd:YAG crystal has relatively large gain as a laser medium. Additionally, the Nd:YAG crystal has a variety of advantages such as chemical and physical stability, high mechanical strength, high thermal conductivity, applicability to a high-power laser device, an established method of crystal growth, and stable supply.

Incidentally, in recent years, a semiconductor laser (LD) pumped solid state laser device has been used as a laser device, in which a beam emitted from a laser diode is used as excited light, namely, excited light is emitted by semiconductor laser.

In such a semiconductor laser (LD) pumped solid state laser, a large absorption coefficient for pumping light is required as a characteristic of a laser crystal used as a laser medium.

A semiconductor laser (LD) pumped solid state laser can be made smaller in size, such as a micro chip laser or a single longitudinal mode laser. However, in order to efficiently downsize the semiconductor laser pumped solid state laser, it is necessary to use a laser crystal with a short absorption length for pumping light to largely absorb a beam from a laser diode in a short distance. For this reason, a laser crystal having a large absorption coefficient for pumping light is demanded as a laser medium.

Here, regarding the Nd:YAG crystal, when neodymium serving as a laser active ion is added, neodymium substitutes for an yttrium ion. However, in a conventional art, a maximum concentration is an atomicity ratio of about 1.3% and neodymium is not added by substituting an ion at a concentration higher than the maximum concentration.

Meanwhile, with an yttrium vanadate (hereinafter, optionally referred to gas "YVO") crystal, which has been widely used as a laser medium of a semiconductor laser (LD) pumped solid state laser device, it is possible to readily add neodymium serving as a laser active ion at a high concentration, an atomicity ratio of about 3%.

Further, the Nd:YAG crystal, in which neodymium is added at a concentration of 1% in terms of atomicity ratio, has an absorption coefficient of about 8 $cm^{-1}$. Meanwhile, regarding the yttrium vanadate crystal doped with neodymium (hereinafter, optionally referred to as "Nd:YVO$_4$"), in which neodymium is added at a high-concentration of 3% of an atomicity ratio, it is possible to obtain a high absorption coefficient of about 40 $cm^{-1}$.

Hence, regarding an absorption length required for absorbing 90% of excited light, i.e., a length of a crystal, the Nd:YAG crystal with an absorption coefficient of about 8 $cm^{-1}$ requires a length of about 3 mm. Meanwhile, the Nd:YVO$_4$ crystal with an absorption coefficient of about 40 $cm^{-1}$ only requires a length of about 0.5 mm.

As described above, the Nd:YVO$_4$ crystal is characterized by a large absorption coefficient, which is required for the laser medium of a semiconductor laser (LD) pumped solid state laser device. On the other hand, the Nd:YVO$_4$ crystal presents a large number of disadvantages when being used as a laser medium.

Namely, the Nd:YVO$_4$ crystal is less likely to release heat because its thermal conductivity is about one third that of the Nd:YAG crystal. Moreover, on an upper laser level, the Nd:YVO$_4$ crystal has a short life time of 90$\mu$ seconds as compared with the Nd:YAG crystal, resulting in small strage of energy. Further, because of its optical anisotropy, the Nd:YVO$_4$ crystal is likely to be oscillated by specific polarization and is susceptible to thermal distortion. Other disadvantages are further presented such as difficulty in forming a crystal.

For this reason, the Nd:YVO$_4$ crystal is preferable as a laser medium used for the semiconductor laser (LD) pumped solid state laser with low power and a small threshold value. However, regarding a laser medium used for the semiconductor laser (LD) pumped solid state laser with high power and a large threshold value for use in working and so on, even though the size is increased, the Nd:YAG crystal is used. Thus, the entire laser device is inevitably increased in size.

Therefore, a proposal has been strongly demanded on a laser device being able to entirely reduce the size thereof for micro chip lasers and single longitudinal mode lasers.

OBJECTS AND SUMMARY OF THE INVENTION

The present invention is devised to respond to the demand on the above-mentioned conventional art. An object of the present invention is to provide a laser device, which has an excellent characteristic originally exerted by an yttrium-aluminum-garnet crystal doped with neodymium and is reduced in size by using an entirely downsized laser medium.

In order to attain the above object, the present invention provides a laser device comprising a laser medium disposed in a resonator, in which excited light is incident upon the laser medium so as to cause laser oscillation in the resonator, and laser is emitted from the resonator, the laser medium being an yttrium-aluminum-garnet single crystal, in which neodymium is added as a laser active ion at a concentration exceeding an atomicity ratio of 1.3%.

Therefore, according to the present invention, the yttrium-aluminum-garnet single crystal, in which neodymium is added as a laser active ion at a concentration exceeding 1.3% in terms of atomicity ratio, is used as a laser medium. With such a laser medium composed of the yttrium-aluminum-garnet single crystal, in which neodymium is added at a high concentration, it is possible to obtain a high absorption coefficient relative to excited light. Thus, it is possible to provide an excellent characteristic originally exerted by the yttrium-aluminum-garnet crystal doped with neodymium and to entirely reduce the size thereof, thereby entirely downsizing the laser device.

In this case, in the above laser medium, the above neodymium may be added at a concentration of from 2% to 3% in terms of atomicity ratio.

Further, the excited light may be emitted by semiconductor lasers.

Moreover, the semiconductor laser excitation may be, for example, longitudinal excitation or transverse excitation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a) and 5(b) are graphs showing experimental results obtained by the inventor of the present application.

FIGS. 8(a) and 8(b) are graphs showing experimental results obtained by the inventor of the present application.

DETAILED DESCRIPTION OF THE PREFERRED EMBODIMENTS

Hereinafter, an embodiment of a laser device according to the present invention will be described in detail with reference to the accompanying drawings.

Figure 1:
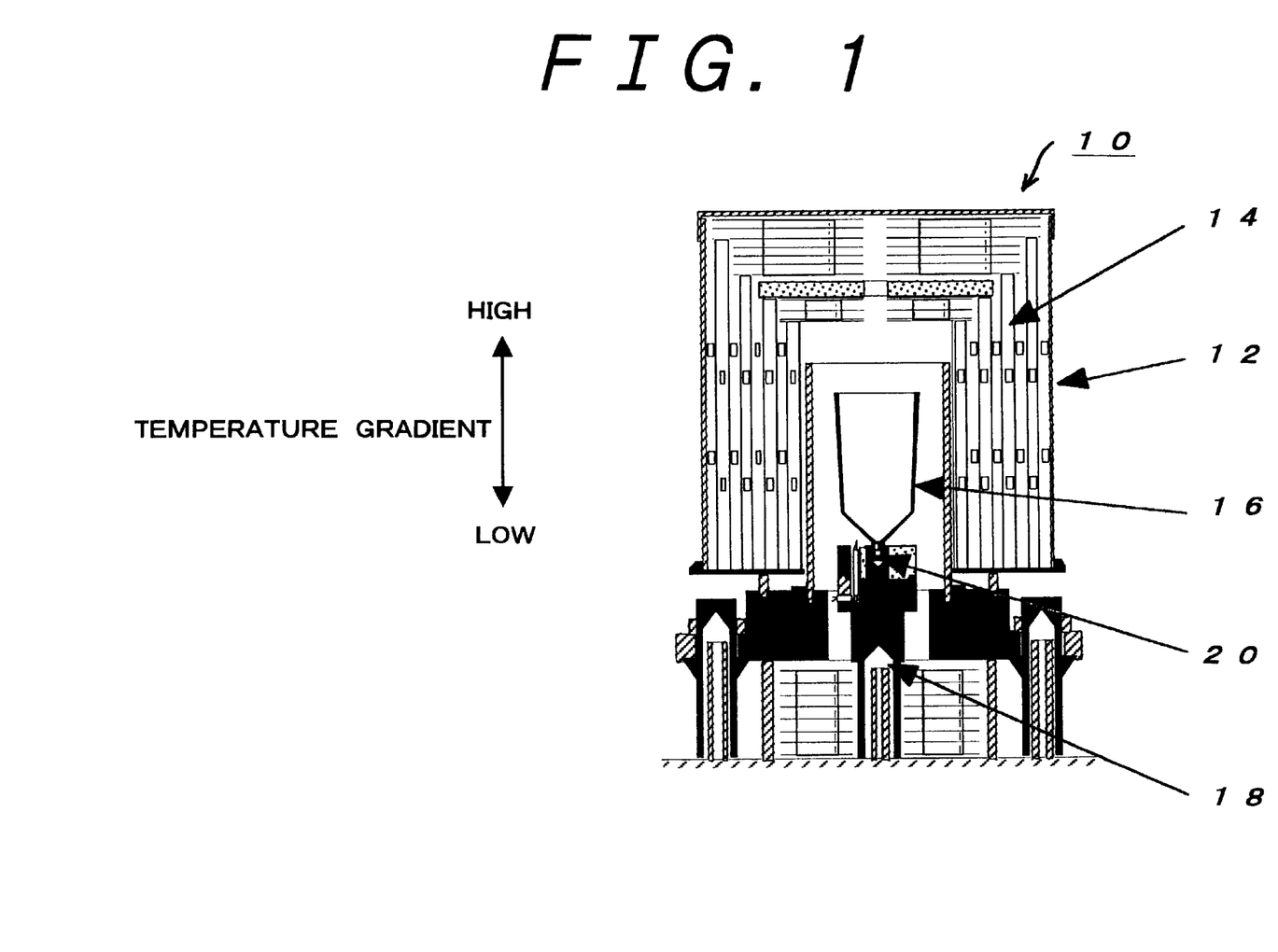
FIG. 1 is a diagram showing an electric furnace for growth of a laser crystal used for a laser device according to an embodiment of the present invention.

First, FIG. 1 is a diagram showing an electric furnace for growth of a laser crystal used for a laser device according to an embodiment of the present invention. An electric furnace 10 is provided for forming an yttrium-aluminum-garnet single crystal doped with neodymium as a laser medium, the crystal being formed by adding neodymium with a high concentration according to a crystal forming method referred to as TGT method (Temperature Gradient Technique).

The electric furnace 10 is constituted such that a molybdenum crucible 16 is covered with a graphite heater 14, which is coated with a molybdenum heat partition 12, so as to maintain a high temperature around the crucible 16.

On the lower part of the graphite heater 14, electrodes and the bottom of the crucible 16 are cooled by a water-cooling rod 18 so as to achieve temperature gradient in the electric furnace 10. Namely, setting is made such that a temperature is high on the upper part of the crucible 16 and low on the bottom thereof.

Here, a seed crystal 20 is disposed on the bottom of the crucible 16, and a YAG crystal grows with the seed crystal 20 serving as a nucleus.

According to Czochralski method (Cz method), which is an ordinary method of growing melt, a solid/melt interface is exposed so as to be susceptible to an external change in temperature. However, according to TGT method using the electric furnace 10, a solid/melt interface is covered with melt. Thus, the influence of an external change in temperature is largely relieved before reaching the interface, so that the interface is less susceptible to the influence of an external change in temperature as compared with the above-mentioned Cz method.

Also, according to Cz method, a temperature decreases from the bottom to the upper part of a crucible. Meanwhile, as earlier mentioned, according to TGT method using the electric furnace 10, a temperature increases from the bottom to the upper part of the crucible 16. Therefore, convection of melt in Cz method can be remarkably reduced by TGT method.

As described above, according to TGT method, a solid/melt interface is less susceptible to the influence of an external change in temperature and convection of melt liquid can be suppressed in the crucible 16. Hence, it is possible to grow a crystal in a stable manner and reduce segregation.

A crystal is grown by the above-mentioned TGT method. It is therefore possible to form an yttrium-aluminum-garnet single crystal, in which neodymium is added as a laser active ion at a concentration exceeding an atomicity ratio of 1.3%. The resulted crystal is used as a laser medium.

Namely, by growing a crystal by TGT method, it is possible to form crystals such as an Nd:YAG single crystal doped with Nd at an atomicity ratio of 2%, and that doped with Nd at an atomicity ratio of 3%. The crystals can be used as laser mediums.

Figure 2:
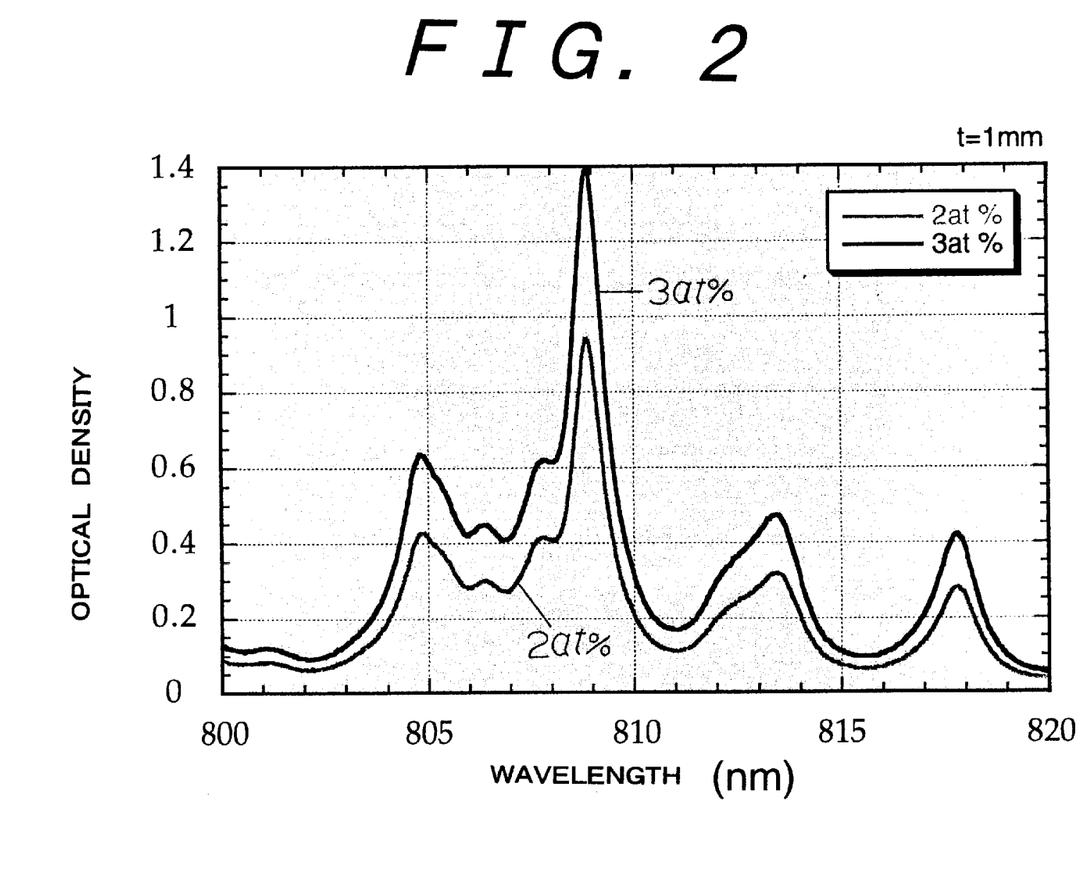
FIG. 2 is a graph showing a measurement result on an absorption spectrum that was measured by the inventor of the present application. An absorption spectrum is measured by a spectrophotometer around 810 nm, regarding an Nd:YAG single crystal doped with Nd at an atomicity ratio of 2% (in FIG. 2, represented by "2 at %") and an Nd:YAG single crystal doped with Nd at an atomicity ratio of 3% (in FIG. 2, represented by "3 at %"), with a thickness (t) of 1 mm (t=1 mm). An abscissa axis represents an optical density and an ordinate axis represents a wavelength.

FIG. 2 shows a measurement result of an absorption spectrum measured by the inventor of the present application, regarding the Nd:YAG single crystals doped with Nd at an atomicity ratio of 2% and at an atomicity ratio of 3%, the crystals being formed in the foregoing manner.

Namely, FIG. 2 is a graph showing a measurement result on an absorption spectrum that was measured by the inventor of the present application by means of a spectrophotometer around 810 nm, regarding the Nd:YAG single crystal doped with Nd at an atomicity ratio of 2% which is doped with Nd at an atomicity ratio of 2%, (in FIG. 2, represented by "2 at %". Here, in FIG. 3 and later, "2 at %" represents the Nd:YAG single crystal doped with Nd at an atomicity ratio of 2%.), and the Nd:YAG single crystal which is doped with Nd at an atomicity ratio of 3% (in FIG. 2, represented by "2 at %". Here, in FIG. 3 and later, "3 at %" represents the Nd:YAG single crystal doped with Nd at an atomicity ratio of 3%.), with a thickness (t) of 1 mm (t=1 mm). Additionally, in FIG. 2, an ordinate axis represents an optical density and an abscissa axis represents a wavelength.

Figure 3:
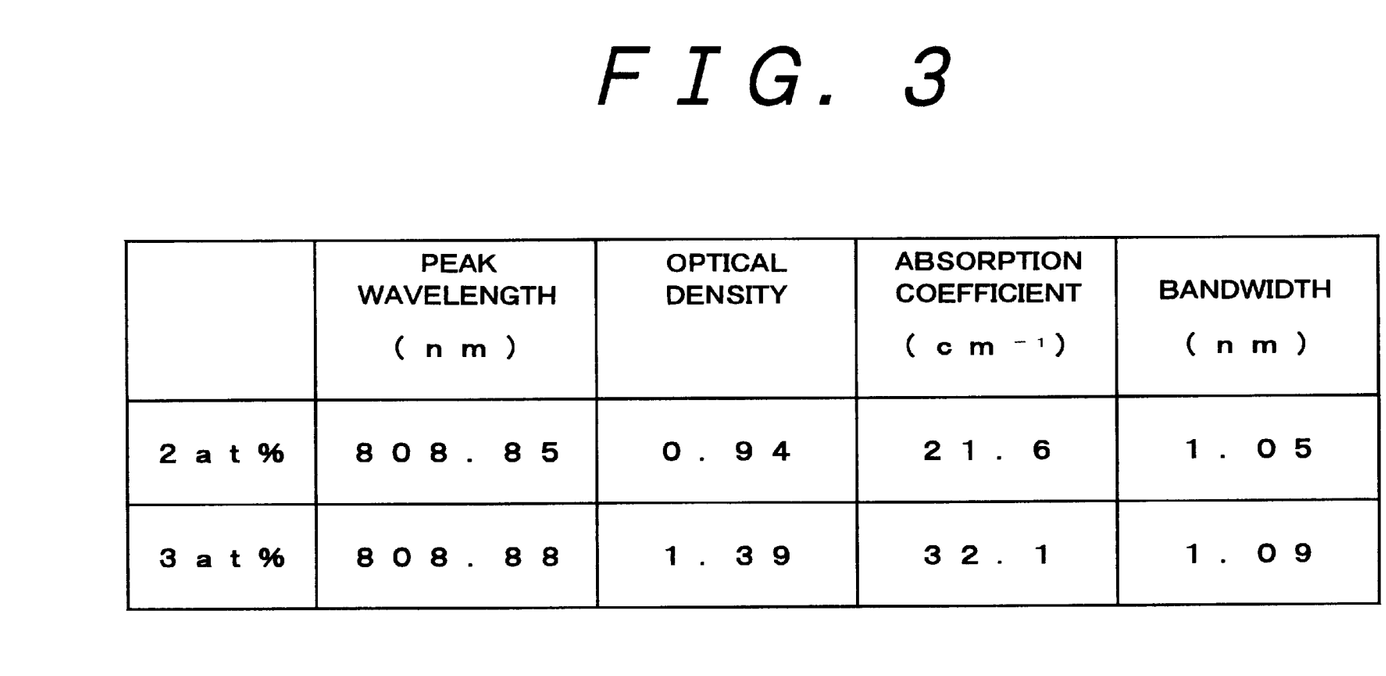
FIG. 3 is a table showing an absorption peak relative to light used as excited light of laser diode excitation having a peak wavelength of 808.85 nm, by the case of using the Nd:YAG single crystal doped with Nd at an atomicity ratio of 2% (represented as "2 at %" in FIG. 3) and that doped with Nd at an atomicity ratio of 3% (represented as "3 at %" in FIG. 3) as laser mediums of the semiconductor laser (LD) pumped solid state laser device according to the graph of FIG. 2.

Further, FIG. 3 is a table showing an absorption peak relative to light used as excited light in laser diode excitation with a peak wavelength of 809 nm, in the case where the above Nd:YAG single crystals are used as laser mediums of the semiconductor laser (LD) pumped solid state laser device.

As shown in the table of FIG. 3, at an absorption peak, an absorption coefficient is 21.6 cm$^{-1}$ in the case of the Nd:YAG single crystal doped with Nd at an atomicity ratio of 2%, and an absorption coefficient is 32.1 cm$^{-1}$ in the case of the Nd:YAG single crystal doped with Nd at an atomicity ratio of 3%.

Here, it has been widely known that an absorption coefficient at an absorption peak is 11 cm$^{-1}$ in the case of an Nd:YAG crystal doped with Nd at an atomicity ratio of 1%. Thus, in the case of the Nd:YAG single crystal doped with Nd at an atomicity ratio of 2%, it is possible to obtain an absorption coefficient substantially twice that of the Nd:YAG single crystal doped with Nd at an atomicity ratio of 1%. In the case of the Nd:YAG single crystal doped with Nd at an atomicity ratio of 3%, it is possible to obtain an absorption coefficient substantially triple that of the Nd:YAG single crystal doped with Nd at an atomicity ratio of 1%.

Therefore, regarding the an Nd:YAG single crystals doped with Nd at an atomicity ratio of 2% and 3%, it is possible to remarkably shorten an absorption length required for absorbing 90% of excited light, i.e., a length of a crystal, as compared with the Nd:YAG single crystal doped with Nd at an atomicity ratio of 1%.

Moreover, the Nd:YAG single crystal doped with Nd at an atomicity ratio of 3% is slightly larger in bandwidth than the Nd:YAG single crystal doped with Nd at an atomicity ratio of 2%. The same holds for other peak wavelengths as well as a peak wavelength of 809 nm.

The following will discuss a laser device constituted by using an Nd:YAG single crystal as a laser medium. In the Nd:YAG single crystal, Nd is added as a laser active ion at a concentration exceeding an atomicity ratio of 1.3%, like a crystal such as an Nd:YAG single crystal doped with Nd at an atomicity ratio of 2% or 3%.

Incidentally, for simple explanation, the foregoing Nd:YAG single crystal is generically referred to as a "YAG single crystal with high-concentration Nd", in which Nd is added as a laser active ion at a concentration exceeding an atomicity ratio of 1.3%, like Nd:YAG single crystals doped with Nd at an atomicity ratio of 2% and 3%.

Figure 4:
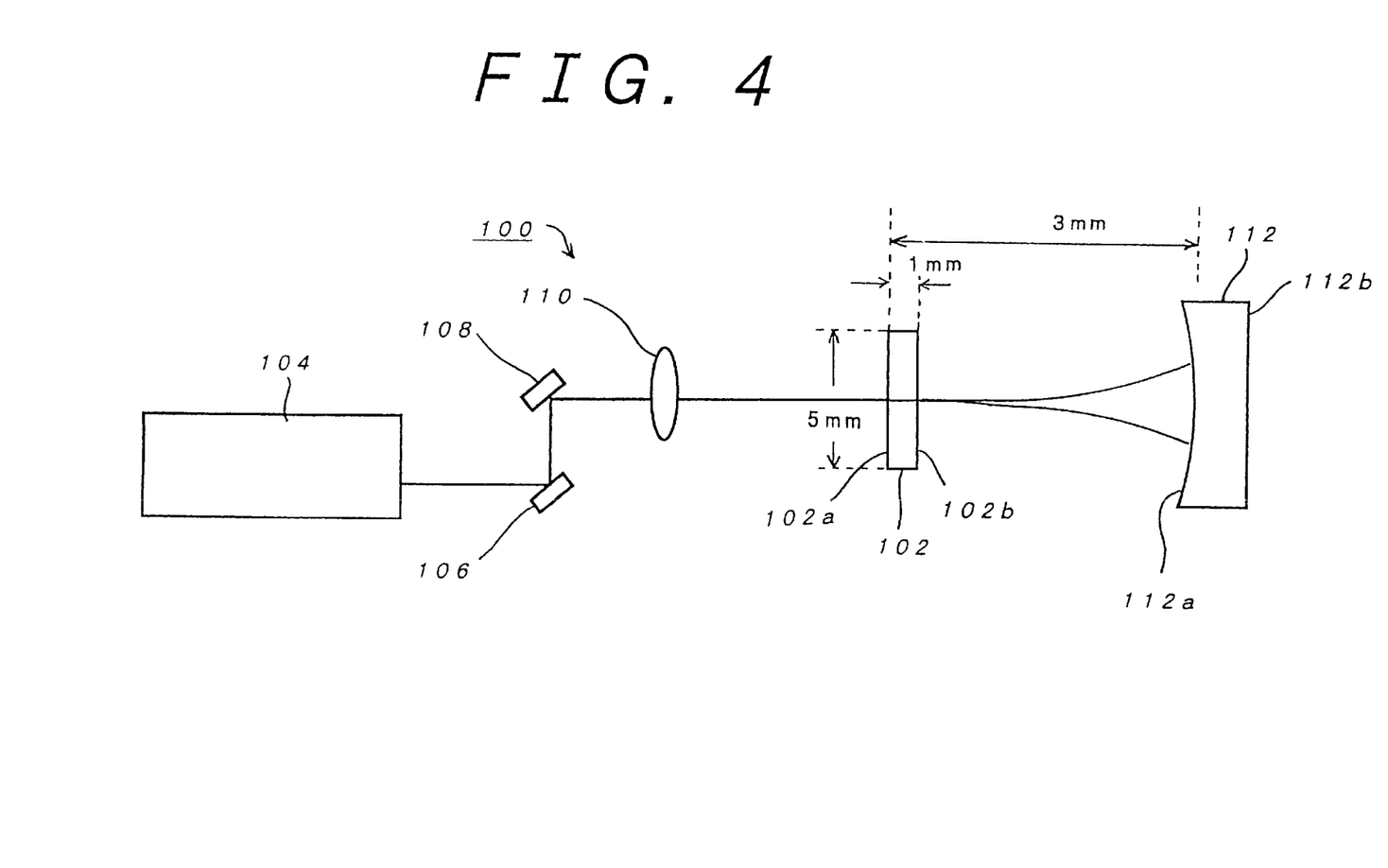
FIG. 4 is an explanatory drawing schematically showing the construction of a laser device for performing a pulse oscillation operation, of laser devices constituted by using a YAG single crystal with high-concentration Nd as a laser medium.

First, FIG. 4 shows a laser device performing a pulse oscillation operation, of laser devices constituted by using the YAG single crystal with high-concentration Nd as a laser medium.

A laser device 100 shown in FIG. 4 is constituted by a YAG single crystal 102 with high-concentration Nd serving as a laser medium, a titanium sapphire laser 104 for generating excited light, total reflection mirrors 106 and 108, a condenser lens 110, and an emitting mirror 112.

Here, the titanium sapphire laser 104 is an exciting laser, which serves as an excited light source for generating excited light for performing the pulse oscillation operation. The titanium sapphire laser 104 has a wavelength of 808.6 nm, a maximum output power of 40 mW on average, and a pulse width of 80 ns with a repetition frequency of 1 kHz.

Further, the YAG single crystal 102 with high-concentration Nd is cut into a size of "5 mm(L) 5 mm(W) 1 mm(T)". A first surface 102a opposing the titanium sapphire laser 104 is coated so as to totally reflect light with a wavelength of 1064 nm but not to reflect light with a wavelength of 809 nm. A second surface 102b opposing the emitting mirror 112 is coated so as not to reflect light with a wavelength of 1064 nm.

Moreover, on the emitting mirror 112, a surface opposing the YAG single crystal 102 with high-concentration Nd is formed as a concave surface 112a whose radius of curvature is 50 mm, and the other surface is formed as a flat surface 112b. Additionally, coating is made on the concave surface 112a so as to have a reflectivity of 90% for light with a wavelength of 1064 nm and the concave surface 112a is configured as a concave mirror. Meanwhile, coating is not made on the flat surface 112b.

Additionally, the condenser lens 110 is made of fused quartz glass with a focal length of 100 mm.

Therefore, in the laser device 100, a resonator is constituted by the first surface 102a and the concave surface 112a, and the YAG single crystal 102 with high-concentration Nd is disposed as a laser medium in the resonator. Additionally, a cavity length of the resonator is set at 3 mm.

In the above construction, excited light emitted from the titanium sapphire laser 104 is incident upon the condenser lens 110 via the total reflection mirrors 106 and 108, and then, the condenser lens 110 converges and emits excited light into the YAG single crystal 102 with high-concentration Nd.

With this arrangement, laser oscillation occurs in the resonator and laser light is emitted from the flat surface 112b of the emitting mirror 112.

Figure 5:
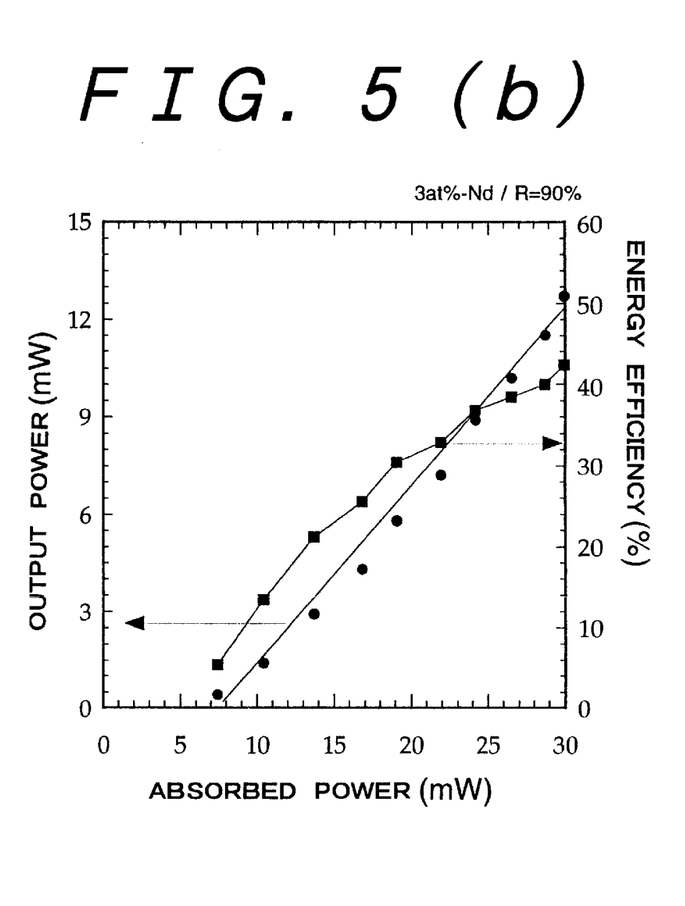
FIG. 5(a) is a graph showing an input/output characteristic in the case where an Nd:YAG single crystal doped with Nd at an atomicity ratio of 2% is used as a YAG single crystal with high-concentration Nd in the laser device of FIG. 4. Also.
FIG. 5(b) is a graph showing an input/output characteristic in the case where an Nd:YAG single crystal doped with Nd at an atomicity ratio of 3% is used as a YAG single crystal with high-concentration Nd in the laser device of FIG. 4. Incidentally, in the graphs of FIGS. 5(a) and 5(b), an abscissa axis represents absorbed power, ● marks on an ordinate axis represent output power, and ■ marks on the ordinate axis represent energy efficiency on each point.

FIGS. 5(a) and 5(b) are graphs showing experimental results obtained by the inventor of the present application. FIG. 5(a) is a graph showing an input/output characteristic in the case where an Nd:YAG single crystal doped with Nd at an atomicity ratio of 2% is used as the YAG single crystal 102 with high-concentration Nd in the laser device 100 of FIG. 4. Also, FIG. 5(b) is a graph showing an input/output characteristic in the case where an Nd:YAG single crystal doped with Nd at an atomicity ratio of 3% is used as the YAG single crystal 102 with high-concentration Nd in the laser device 100 of FIG. 4.

Additionally, in the graphs of FIGS. 5(a) and 5(b), an abscissa axis represents absorbed power, ● marks on an ordinate axis represent output power, and ■ marks on the ordinate axis represent energy efficiency on each point.

Moreover, regarding the Nd:YAG single crystal doped with Nd at an atomicity ratio of 2%, it is possible to obtain an oscillation threshold value of 5.9 mW and output power of 13 mW relative to absorbed power of 26 mW. Maximum efficiency of 50% can be achieved on this point. Slope efficiency reaches 65%, namely, quantum efficiency reaches 86%.

Meanwhile, the Nd:YAG single crystal doped with Nd at an atomicity ratio of 3% has a slightly higher oscillation threshold value of 7.4 mW, and maximum efficiency is 43% at excitation of 30 mW. Slope efficiency is 52%.

Figure 6:
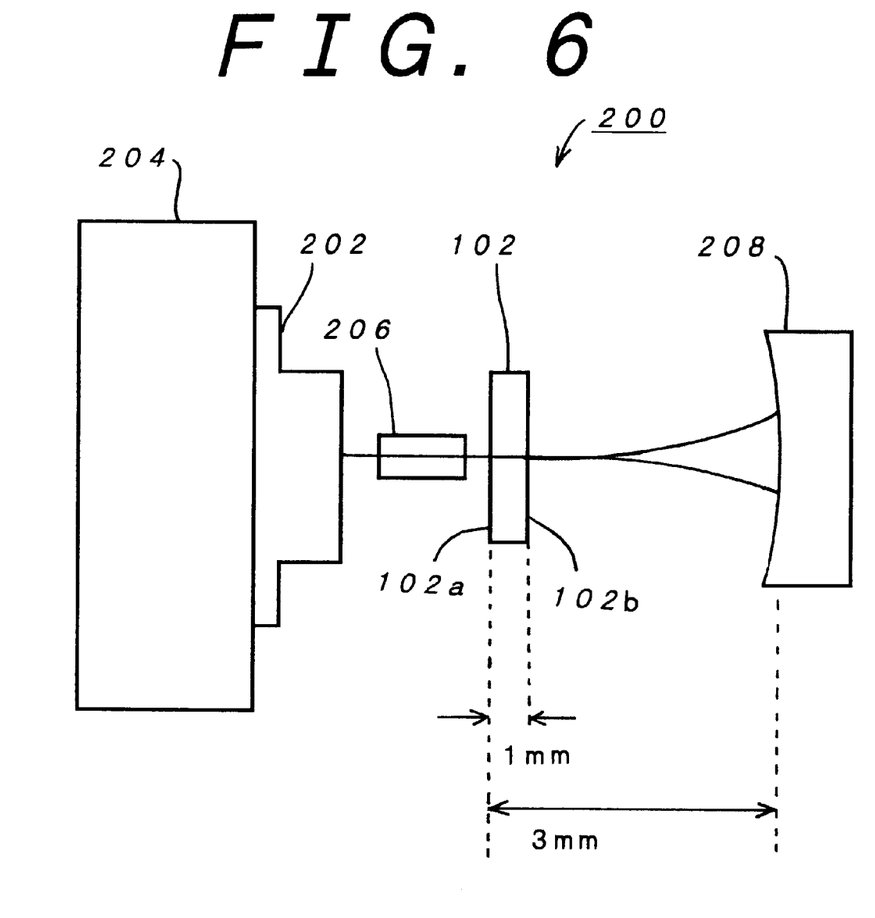
FIG. 6 is an explanatory drawing schematically showing the construction of a laser device performing a CW (continuous wave) oscillation operation, of laser devices constituted by using a YAG single crystal with high-concentration Nd as a laser medium.

Next, FIG. 6 shows a laser device performing a CW (continuous wave) oscillation operation, of laser devices constituted by using a YAG single crystal with high-concentration Nd as a laser medium. The laser device of FIG. 6 is configured as a semiconductor laser (LD) pumped solid state laser device.

Here, in the construction of the laser device shown in FIG. 6, the components being identical or corresponding to those of the laser device 100 of FIG. 4 are denoted by the same reference numerals used in FIG. 4. The detailed description thereof is omitted on the construction and effects.

A laser device 200 of FIG. 6 is constituted by a YAG single crystal 102 with high-concentration Nd serving as a laser medium, a laser diode 202 serving as an excited light source for generating a beam as excited light, a heat sink 204 for heating the laser diode 202, a gradient index lens 206 for converging and emitting a beam, which is emitted as excited light from the laser diode 202, into the YAG single crystal 102 with high-concentration Nd, and an emitting mirror 208.

Here, the laser diode 202 is a 200-μm single stripe laser diode that is made of GaAs/GaAlAs with a wavelength of 809 nm at 25 C., and its maximum output power is 2 W.

Also, the heat sink 204 is composed of a copper block and is water-cooled.

Furthermore, on the emitting mirror 208, a surface opposing the YAG single crystal 102 with high-concentration Nd is formed as a concave surface 208a whose radius of curvature is 750 mm, and the other surface is formed as a flat surface 208b. Additionally, coating is made on the concave surface 208a so as to have a reflectivity of 95% for light with a wavelength of 1064 nm, and the concave surface 208a is configured as a concave mirror. Meanwhile, coating is not made on the flat surface 208b.

Additionally, the gradient index lens 206 is 1.8 mm in diameter.

Therefore, in the laser device 200, a resonator is constituted by the first surface 102a and the concave surface 208a. The YAG single crystal 102 with high-concentration Nd is disposed as a laser medium in the resonator. Here, a cavity length of the resonator is set at 3 mm.

Moreover, semiconductor laser excitation in the laser device 200 is longitudinal excitation, in which excited light is incident on the YAG single crystal 102 with high-concentration Nd serving as a laser medium, in a direction that substantially conforms to an optical axis of light reciprocating in the resonator by laser oscillation.

Figure 7:
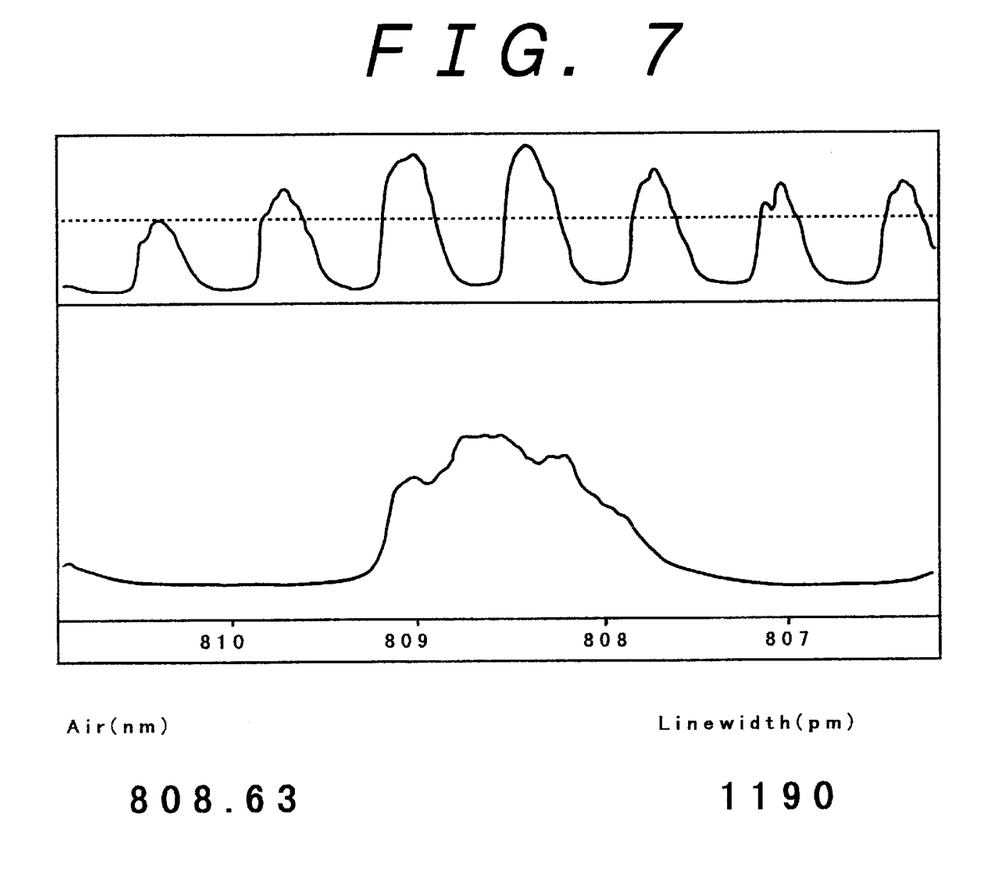
FIG. 7 is a graph showing an emission spectrum of a laser diode with an injected current of 2 A in the laser device of FIG. 6.

Further, FIG. 7 shows an emission spectrum of the laser diode 202 with an injected current of 2 A. A line width of emission is about 1.2 mm. The larger injected current, a peak of the emission spectrum is shifted to a longer wavelength and a line width is increased. In the experiment conducted by the inventor of the present application, a temperature of the laser diode 202 is set so as to achieve maximum absorption at a maximum current of 2A. Also, in the experiment conducted by the inventor of the present application, optimization is not performed according to an injected current.

According to the above construction, when a beam serving as excited light from the laser diode 202 is incident upon the gradient index lens 206, the gradient index lens 206 converges and emits the beam into the YAG single crystal 102 with high-concentration Nd.

Therefore, laser oscillation occurs in the resonator and laser light is emitted from the flat surface 208b of the emitting mirror 208.

Figure 8A:
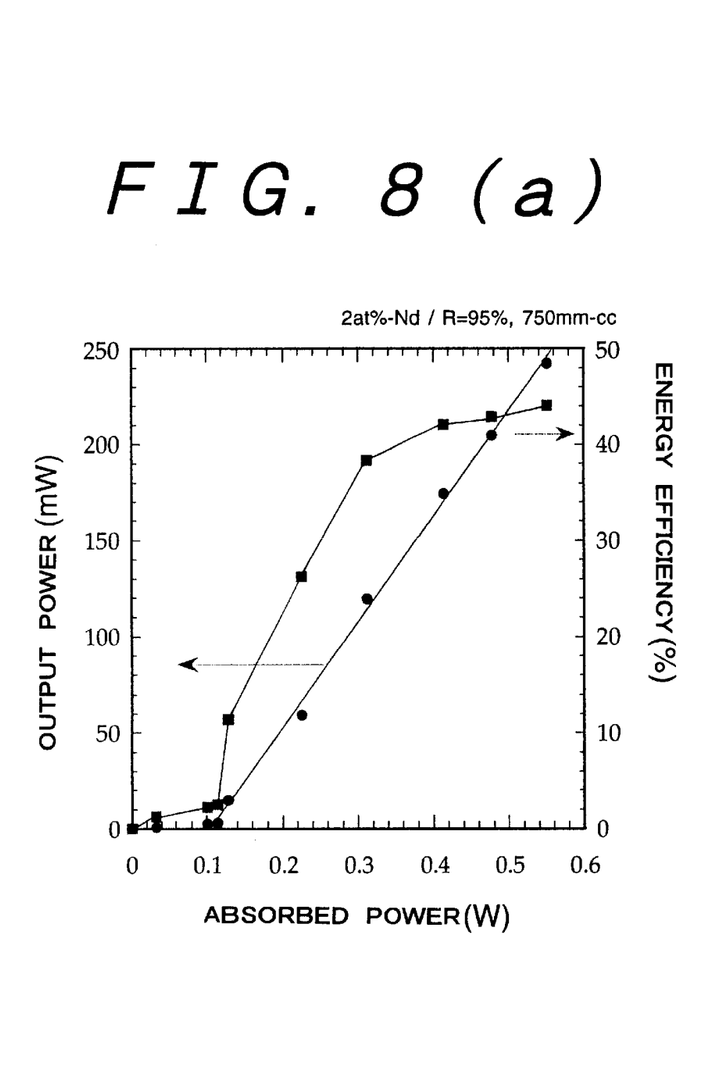
FIG. 8(a) is a graph showing an input/output characteristic in the case where an Nd:YAG single crystal doped with Nd at an atomicity ratio of 2% is used as a YAG single crystal with high-concentration Nd in the laser device of FIG. 6. Also.
Figure 8B:
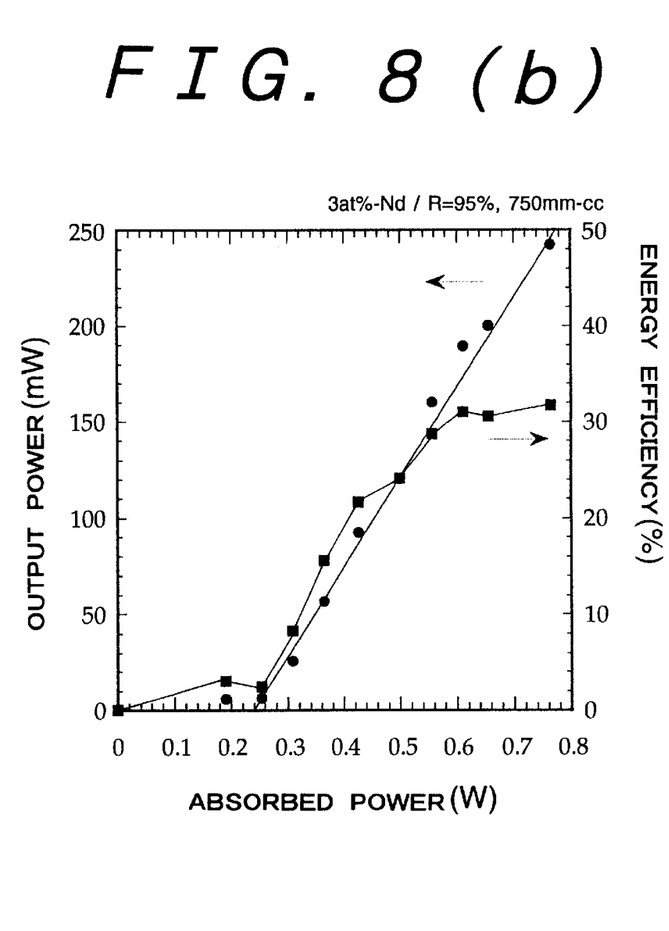
FIG. 8(b) is a graph showing an input/output characteristic in the case where an Nd:YAG single crystal doped with Nd at an atomicity ratio of 3% is used as a YAG single crystal with high-concentration Nd in the laser device of FIG. 6. Incidentally, in the graphs of FIGS. 8(a) and 8(b), an abscissa axis represents absorbed power, ● marks on an ordinate axis represent output power, and ■ marks on the ordinate axis represent energy efficiency on each point.

FIGS. 8(a) and 8(b) are graphs showing experimental results obtained by the inventor of the present application. FIG. 8(a) is a graph showing an input/output characteristic in the case where an Nd:YAG single crystal doped with Nd at an atomicity ratio of 2% is used as the YAG single crystal 102 with high-concentration Nd in the laser device 200 of FIG. 6. Also, FIG. 8(b) is a graph showing an input/output characteristic in the case where an Nd:YAG single crystal doped with Nd at an atomicity ratio of 3% is used as the YAG single crystal 102. with high-concentration Nd in the laser device 200 of FIG. 6.

Additionally, in the graphs of FIGS. 8(a) and 8(b), an abscissa axis represents absorbed power, ● marks on an ordinate axis represent output power, and ■ marks on the ordinate axis represent energy efficiency on each point.

Moreover, regarding the Nd:YAG single crystal doped with Nd at an atomicity ratio of 2%, it is possible to obtain an oscillation threshold value of 110 mW and maximum efficiency of 44% relative to absorbed power of 550 mW. Slope efficiency reaches 56%, namely, quantum efficiency reaches 74%.

Meanwhile, the Nd:YAG single crystal doped with Nd at an atomicity ratio of 3% has a slightly higher oscillation threshold value of 240 mW and maximum efficiency of 32% at excitation of 760 mW. Further, slope efficiency is 52%.

As earlier mentioned, regarding the Nd:YAG single crystal doped with Nd at a high concentration, an absorption coefficient at an absorption peak of 809 nm increases in proportion to a doping concentration. Regarding the Nd:YAG single crystal doped with Nd at an atomicity ratio of 2%, it is possible to obtain a value substantially twice that of an Nd:YAG single crystal doped with Nd at an atomicity ratio of 1%. Moreover, regarding the Nd:YAG single crystal doped with Nd at an atomicity ratio of 3%, it is possible to obtain a value substantially triple that of the Nd:YAG single crystal doped with Nd at an atomicity ratio of 1%.

In other words, with the Nd:YAG single crystal doped with Nd at a high concentration, a high absorption coefficient can be obtained for excited light. Hence, the Nd:YAG single crystal doped with Nd at a high concentration can be substantially equal in absorption length to an Nd:YVO$_4$ single crystal doped with Nd at an atomicity ratio of 1%.

Therefore, according to the laser device, in which the Nd:YAG single crystal doped with Nd at a high concentration is used as a laser medium, it is possible to provide an excellent characteristic originally exerted by an Nd:YAG crystal and to entirely reduce the size of the device.

Moreover, with the laser device, which is downsized as a semiconductor laser (LD) pumped solid state laser device by using the Nd:YAG single crystal doped with Nd at a high concentration as a laser medium, it is possible to considerably increase conversion efficiency from electricity to light, as compared with a conventional laser device with lamp excitation and to readily achieve a single longitudinal mode.

Additionally, the above-mentioned embodiments can be modified as will be described in (1) to (4).

(1) The foregoing embodiments described the case where neodymium is added to an yttrium-aluminum-garnet single crystal at an atomicity ratio of 2% or 3%. Certainly, the present invention is not limited thereto, so that it is only necessary to set a high concentration exceeding an atomicity ratio of 1.3% regarding neodymium added to the yttrium-aluminum-garnet single crystal. The concentration is preferably 1.5% or more, more preferably 1.8% or more, and still further preferably 2 or 3%.

(2) In the foregoing embodiments, semiconductor laser excitation is longitudinal excitation. Certainly, the present invention is not limited thereto. Thus, semiconductor laser excitation may be made by transverse excitation in which excited light is incident upon a laser medium in a direction substantially perpendicular to an optical axis of light reciprocating in the resonator by laser oscillation.

(3) In the foregoing embodiments, TGT method (Temperature Gradient Technique) is used as a method for forming an yttrium-aluminum-garnet single crystal as a laser medium, in which neodymium is added at a high concentration. However, the present invention is not limited thereto, so that the foregoing Cz method may also be applicable. Furthermore, it is also possible to adopt a variety of methods such as Bridgman method, laser ablation method, floating zone method, and laser-heated pedestal method.

(4) The foregoing embodiments and variations (1) to (3) may be combined with one another if necessary.

With the above-mentioned construction, the present invention is greatly effective at providing a laser device, which has an excellent characteristic originally exerted by an yttrium-aluminum-garnet crystal doped with neodymium and is entirely reduced in size by using an entirely downsized laser medium.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-34109 filed on Feb. 10, 2000 including specification, claims, drawings and summary are incorporated herein by reference in its entirety.

What is claimed is:

1. A laser device comprising a laser medium disposed in a resonator, in which excited light is incident upon said laser medium so as to cause laser oscillation in said resonator, and laser light is emitted from said resonator, wherein:

said laser medium is an yttrium-aluminum-garnet single bulk crystal with neodymium added as a laser active ion at a concentration exceeding an atomicity ratio of 1.8%.

2. The laser device according to claim 1, wherein:

said neodymium is added to said laser medium at a concentration of from 2% to 3% in terms of atomicity ratio.

3. The laser device according to claim 2, wherein:

said excited light is emitted by semiconductor laser excitation.

4. The laser device according to claim 3, wherein:

said semiconductor laser excitation is longitudinal excitation.

5. The laser device according to claim 3, wherein:

said semiconductor laser excitation is transverse excitation.

6. The laser device according to claim 1, wherein:

said excited light is emitted by semiconductor laser excitation.

7. The laser device according to claim 6, wherein:

said semiconductor laser excitation is transverse excitation.

8. The laser device according to claim 6, wherein:

said semiconductor laser excitation is longitudinal excitation.

* * * * *